3,296,185
HIGH IMPACT HARD RUBBER COMPOUND AND
METHOD OF MAKING SAME
Thaddeus Frank Cathey, Oak Ridge, George A. Campbell, Newfoundland, and Lyle C. Ryder, Butler, N.J., assignors to Amerace Corporation, New York, N.Y., a corporation of Delaware
No Drawing. Filed Jan. 30, 1964, Ser. No. 341,430
11 Claims. (Cl. 260—41.5)

This invention relates to a hard rubber composition having improved impact properties and more particularly to one having a higher percentage of titanium dioxide and a lower percentage of combined sulfur than is normally used and the method of making same.

Hard rubber compositions having good impact qualities have presented various problems. These compositions normally contain high proportions of combined sulfur. As the sulfur level increases, the degree of hardness also increases, with an accompanying increase in the brittleness of the composition. This is particularly disadvantageous in the use and manufacture of products subject to dynamic conditions such as caster wheels, window frames, photo trays, bowling balls, pipe fittings, and the like.

In addition, the use of a high sulfur content brings about a dark background in the product that is difficult to mask with fillers. This is unsatisfactory when hard rubber compounds having both high impact properties and light colors are required. Bowling balls have presented particular problems in this area. For example, if a bowling ball having a light veneer, or a veneer with artistic configurations therein is desired, the amount of sulfur necessary to give a satisfactory product brings about a dark background which is troublesome to overcome. However, if less sulfur is used the resulting product is not rigid enough for heavy duty use. Further, the tensile strength decreases as the sulfur level is reduced.

It is an object of our invention to overcome the problems heretofore encountered and to provide an improved hard rubber composition having high impact properties while retaining the characteristics of light color, high tensile strength, good abrasion resistance and effective resistance to heat distortion.

It is a further object of our invention to provide such a composition that has rigidity and is not subject to cold flow.

Another object of this invention is to provide a high impact hard rubber composition that is readily moldable and can be manufactured to its finished form by the use of inexpensive compression molds and presses, thus providing low tooling costs.

These and other objects of this invention are accomplished by the use of high percentages of titanium dioxide accompanied by a reduction in the percentage of combined sulfur to the range normally not considered feasible for the production of hard rubber products. The resulting product has unusually high resistance to impact, will not fracture or shatter, and does not have the expected decrease of hardness that is ordinarily brought about upon decreasing the sulfur level.

In compounding the improved high impact hard rubber composition, we employ synthetic rubber. We prefer a combination of butadiene-acrylonitrile rubber and styrene-butadiene rubber. It should be noted however that either of the above may be used alone and that other synthetic rubbers and combinations thereof having similar characteristics may also be used in the composition. Synthetic rubbers of this type are characterized by being polymers of hydrocarbon units with unsaturated double bonds.

Various activators and activator-accelerators may be employed in the manufacturing process. We prefer to use magnesium oxide as the activator, but other activators such as zinc oxide may also be employed. As an activator-accelerator we prefer the analog of N-cyclohexyl-benzothiazole sulfenamide. This activator-accelerator may be used alone or in combination with a fatty acid such as stearic acid to accomplish the same result. It may also be desirable to employ the use of a plasticizer to allow the product greater workability, to improve extrusion and reduce stickiness on the mill and also to provide lubrication. We use sulfur as the hardening and vulcanizing agent. As previously indicated, we also employ titanium dioxide in higher quantities than previously used to improve the impact properties and to allow for the use of less sulfur than normally considered feasible in the production of hard rubber compositions thus having a resultant product exhibiting good hardness and superior impact qualities.

The synthetic rubber is first suitably mixed with the titanium dioxide as in a Banbury mixer. Thereupon, the remainder of the ingredients are added in the following order: first, the plasticizer, then secondly the activator and the activator-accelerators, and thirdly the sulfur. The composition is mixed, the total mixing time for the whole procedure taking about five to eight minutes. After this mixing cycle, the mixture is dumped on a cool mill whereupon the resultant sheets are cut into slabs and cooled to room temperature. The compound is then formed to the desired shape as by molding and cured by heating at an elevated temperature in excess of 275° F., the upper limit being determined by the temperature at which the material will be adversely affected. The composition is treated for a period of time sufficient for it to be cured or set. This time will vary with the temperature employed. The higher the temperature the less time needed for the curing operation. Under any circumstances the temperature should be maintained below that at which the material is adversely affected. We have found that for most purposes where a temperature of 320° F. is employed, satisfactory curing is obtained in a period of approximately sixty minutes.

As the result of using varying quantities of titanium dioxide as part of the composition we discovered that when unusually high amounts of titanium dioxide are used an unusual phenomenon occurs, namely that the impact strength of the resultant compound increases at a rapidly accelerating rate to a point far in excess of anything that could be anticipated. The use of titanium dioxide in the hard rubber composition art is old. However, it was used primarily as whitening pigment, and it was used with corresponding high sulfur levels. In addition, it was believed chemically inert. We attribute the unusually sharp increase in impact strength to the high amount of titanium dioxide present in the composition together with a reduced sulfur level.

In addition, it was determined that if the titanium dioxide-synthetic rubber ratio was kept constant and the sulfur level was varied the unusually high impact properties were maintained even when the sulfur level was reduced to below that which is considered normally feasible for hard rubber compositions. While one might normally expect the impact properties of a hard rubber composition to increase somewhat as the sulfur level decreases, it is not normal for there to be such a rapid increase as that experienced herein. Another equally surprising result was obtained, namely that while the sulfur was reduced below the level considered acceptable for hard rubber compositions, the compound, in addition to having unusually high impact properties, was equally satisfactory as a hard rubber product. It had good properties regarding such factors as tensile strength, abrasion resistance, effective resistance to heat distortion and did not deform on standing. In addition, the resultant product proved readily moldable, and capable of being manufactured with the aid of inexpensive compression molds and presses. The resulting product has a notched izod impact of as high as 2.5 foot-pounds per inch of notch when tested, according to American Society for Testing Materials, Designation D256, Method A.

Testing results indicated that the quantity of titanium dioxide used preferably should be about equal to that of the synthetic rubber content of the composition. While this ratio is preferred, good results can be achieved when between 85 to 120 parts by weight of titanium dioxide per 100 parts of synthetic rubber are used. Satisfactory results may be obtained by using quantities of titanium dioxide between about 65 to 150 parts by weight per 100 parts of synthetic rubber.

When the indicated proportions of titanium dioxide are used, we have found that the quantity or proportion of sulfur should be less than the theoretical coefficient of vulcanization at saturation of the rubber hydrocarbon. The theoretical coefficient of vulcanization is defined as the number of units by weight of sulfur which at saturation will combine with 100 units by weight of rubber or unsaturated hydrocarbon, chemically presumably stoichiometrically but not necessarily structurally at the double bond of each unit of the polymer.

The expression "saturation amount of sulfur" as used herein shall mean a quantity equal to the theoretical coefficient of vulcanization at saturation.

We have found that preferred results are achieved if between approximately 31% and 55% by weight of the saturation quantity or theoretical coefficient of vulcanization at saturation of sulfur is used per each 100 units of hydrocarbon polymer. Good results may be obtained if between about 30% and 60% by weight of the saturation quantity or theoretical coefficient of vulcanization at saturation of sulfur is used per each 100 units of hydrocarbon polymer. Further, satisfactory results may be obtained if between about 28% and 76% by weight of the saturation quantity or theoretical coefficient of vulcanization at saturation of sulfur is used for each 100 units of hydrocarbon polymer.

The following are typical examples of the procedures for preparing our improved hard rubber composition.

*Example 1*

A high impact hard rubber composition embodying our invention is prepared as hereafter explained from the following ingredients in the following proportions by weight:

| | |
|---|---|
| Butadiene-acrylonitrile rubber (Chemigum N6, Goodyear Chemical Division) | 83.4 |
| Styrene-butadiene rubber (Type 1013) | 16.6 |
| Titanium dioxide | 102.5 |
| Sulfur | 30.0 |
| Magnesium oxide | 5.3 |
| Analog of "N-cyclohexyl-benzothiazole sulfenamide" | 2.0 |
| | 239.8 |

The butadiene-acrylonitrile rubber and styrene-butadiene rubber is fist mixed with the titanium dioxide in a Banbury mixer at 40–60 r.p.m. with the mixing cycle taking approximately 2½ minutes. Magnesium oxide, the activator and the analog of N-cyclohexyl-benzothiazole sulfenamide, the activator-accelerator are then added. After about ½ minute the sulfur is added to the mixture. The total mixing time takes about 5 to 8 minutes. The mixture is then dumped on a cool mill and thereafter slabbed off said mill. The sheets are cut into slabs and cooled to room temperature. The mixture is then formed to the desired shape as by molding. Thereafter, it is cured for 120 minutes at 290° F. for a ¼ inch thickness.

*Example 2*

A high impact hard rubber composition embodying our invention is prepared as hereafter explained from the following ingredients in the following proportions by weight:

| | |
|---|---|
| Butadiene-acrylonitrile rubber | 50.0 |
| Styrene-butadiene rubber (Type 1018) | 50.0 |
| Titanium dioxide | 100.0 |
| Sulfur | 32.0 |
| Stearic acid | 1.0 |
| Polyester plasticizer with 35% dioctyl phthalate | 5.0 |
| Magnesium oxide | 5.0 |
| Analog of "N-cyclohexy-benzothiazole sulfenamide" | 2.0 |
| | 245.0 |

The synthetic rubber and titanium dioxide are mixed and treated in the same fashion as set forth in Example 1. The plasticizer (polyester plasticizer with 35% dioctyl phthalate) is added when the temperature has reached 250° F. in the Banbury mixer. After 30 seconds the stearic acid and magnesium oxide plus the analog of N-cyclohexyl-benzothiazole sulfenamide are added. After another 30 seconds, the sulfur is added. The mixing cycle takes about 5 to 8 minutes. Thereupon, the mixture is formed and then cured. It is cured for 120 minutes at a temperature of 285° F. for a ¼ inch thickness.

*Example 3*

A high impact hard rubber composition embodying our invention is prepared as hereafter explained from the following ingredients in the following proportions by weight:

| | |
|---|---|
| Butadiene-acrylonitrile rubber | 83.4 |
| Styrene-butadiene rubber (Type 1013) | 16.6 |
| Titanium dioxide | 90.0 |
| Sulfur | 20.0 |
| Stearic acid | 1.0 |
| Magnesium oxide | 5.3 |
| Analog of "N-cyclohexyl-benzothiazole sulfenamide" | 2.0 |
| | 218.3 |

The synthetic rubber and titanium dioxide are mixed and treated in the same fashion as set forth in Example 1. When the temperature has reached 250° F. in the Banbury mixer the stearic acid and magnesium oxide plus the analog of N-cyclohexyl-benzothiazole sulfenamide are added. After 30 seconds the sulfur is added. The mixing cycle takes about 5 to 8 minutes. Thereupon the mixture is formed and then cured. It is cured for 40 minutes at a temperature of 330° F. for a ¼ inch thickness.

*Example 4*

A high impact hard rubber composition embodying our invention is prepared as hereafter explained from the following ingredients in the following proportions by weight:

| | |
|---|---|
| Styrene-butadiene rubber (Type 1013) | 100.0 |
| Titanium dioxide | 100.0 |
| Sulfur | 15.0 |
| Magnesium oxide | 5.0 |
| Analog of "N-cyclohexyl-benzothiazole sulfenamide" | 5.0 |
| | 225.0 |

The same procedure is followed to prepare the above formulation as described in Example 1. This compound is cured for 30 minutes at 320° F. for a ¼ inch thickness.

Example 5

A high impact hard rubber composition embodying our invention is prepared as hereafter explained from the following ingredients in the following proportions by weight:

| | |
|---|---|
| Butadiene-acrylonitrile rubber (Type 1043) (Hycar 1043, B. F. Goodrich Chemical Co.) | 100.0 |
| Titanium dioxide | 100.0 |
| Sulfur | 19.0 |
| Magnesium oxide | 5.0 |
| Analog of "N-cyclohexyl-benzothiazole sulfenamide" | 5.0 |
| | 229.0 |

The same procedure is followed to prepare the above formulation as described in Example 1. This compound is cured for 120 minutes at 290° F. for a ¼ inch thickness.

In each of the foregoing examples, the other materials indicated in this specification may be substituted for the specific ingredients listed in the examples. Similarly the proportions of materials may be varied within the indicated limits.

It is apparent that variations and changes may be employed without departing from the scope of our invention as defined in the appended claims.

We claim:

1. An improved hard rubber composition characterized by relatively high impact strength while maintaining relatively high rigidity comprising synthetic rubber in the form of a polymer of hydrocarbon units initially having unsaturated double bonds, sulfur chemically combined at some of said initially unsaturated double bonds, and titanium dioxide, the composition having titanium dioxide in the proportion of between approximately 65 to about 150 parts by weight and between approximately 28% and 76% by weight of the saturation quantity of sulfur as herein defined per 100 parts of synthetic rubber.

2. An improved hard rubber composition as set forth in claim 1 in which the synthetic rubber is selected from the group consisting of butadiene-acrylonitrile rubber and styrene-butadiene rubber.

3. An improved hard rubber composition characterized by relatively high impact strength while maintaining relatively high rigidity comprising synthetic rubber in the form of a polymer of hydrocarbon units initially having unsaturated double bonds, sulfur chemically combined at some of said initially unsaturated double bonds, and titanium dioxide, the composition having titanium dioxide in the proportion of between approximately 85 and 120 parts by weight and between approximately 30% and 60% by weight of the saturation quantity of sulfur as herein defined per 100 parts of synthetic rubber.

4. An improved hard rubber composition characterized by relatively high impact strength while maintaining relatively high rigidity comprising synthetic rubber in the form of a polymer of hydrocarbon units initially having unsaturated double bonds, sulfur chemically combined at some of said initially unsaturated double bonds and titanium dioxide, the composition having about equal parts by weight of titanium dioxide and synthetic rubber and between approximately 31% and 55% by weight of the saturation quantity of sulfur as herein defined per 100 parts of synthetic rubber.

5. An improved hard rubber composition as set forth in claim 4 in which the synthetic rubber is selected from the group consisting of butadiene-acrylonitrile rubber and styrene-butadiene rubber.

6. The method of preparing an improved hard rubber composition characterized by relatively high impact strength while maintaining relatively high rigidity which comprises mixing synthetic rubber in the form of a polymer of hydrocarbon units initially having unsaturated double bonds with titanium dioxide in the proportion of between approximately 65 to 150 parts by weight of titanium dioxide per 100 parts of synthetic rubber at elevated temperatures, thereafter adding between approximately 28% and 76% by weight of the saturation quantity of sulfur as herein defined per 100 parts of synthetic rubber and then forming and curing said compound.

7. The method of preparing an improved hard rubber composition as set forth in claim 6 in which the synthetic rubber is selected from the group consisting of butadiene-acrylonitrile rubber and styrene-butadiene rubber.

8. The method of preparing an improved hard rubber composition characterized by relatively high impact strength while maintaining relatively high rigidity which comprises mixing synthetic rubber in the form of a polymer of hydrocarbon units initially having unsaturated double bonds with titanium dioxide in the proportion of between approximately 85 to 120 parts by weight of titanium dioxide per 100 parts of synthetic rubber at elevated temperatures, thereafter adding between approximately 30% and 60% by weight of the saturation quantity of sulfur as herein defined per 100 parts of synthetic rubber and then forming and curing said compound.

9. The method of preparing an improved hard rubber composition characterized by relatively high impact strength while maintaining relatively high rigidity which comprises mixing synthetic rubber in the form of a polymer of hydrocarbon units initially having unsaturated double bonds with titanium dioxide in the proportion of approximately equal parts by weight of titanium dioxide per 100 parts of synthetic rubber at elevated temperatures, thereafter adding between approximately 31% and 55% by weight of the saturation quantity of sulfur as herein defined per 100 parts of synthetic rubber and then forming and curing said compound.

10. The method of preparing an improved hard rubber composition as set forth in claim 9 in which the synthetic rubber is selected from the group consisting of butadiene-acrylonitrile rubber and styrene-butadiene rubber.

11. The method of preparing an improved hard rubber composition characterized by relatively high impact strength while maintaining relatively high rigidity which comprises, mixing synthetic rubber in the form of a polymer of hydrocarbon units initially having unsaturated double bonds selected from the group consisting of butadiene-acrylonitrile rubber and styrene-butadiene rubber with titanium dioxide in the proportion of approximately equal parts by weight of titanium dioxide per 100 parts of synthetic rubber at elevated temperatures, thereafter adding small amounts of activators and activator-accelerators, and next adding between approximately 31% and 55% by weight of the saturation quantity of sulfur as herein defined per 100 parts of synthetic rubber and then forming and curing said compound.

No references cited.

MORRIS LIEBMAN, *Primary Examiner.*

J. S. WALDRON, *Examiner.*